No. 687,205. Patented Nov. 26, 1901.
L. P. DELANO.
JOURNAL BEARING.
(Application filed Jan. 21, 1901.)
(No Model.)
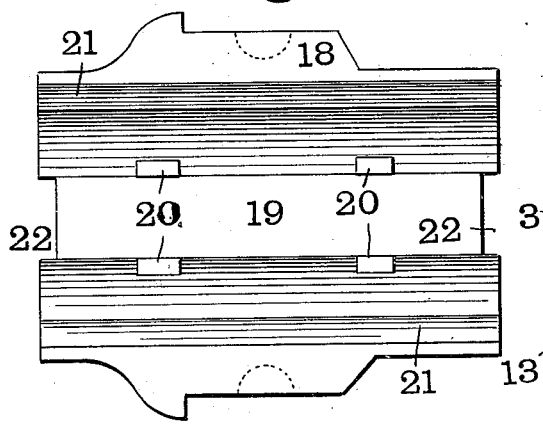
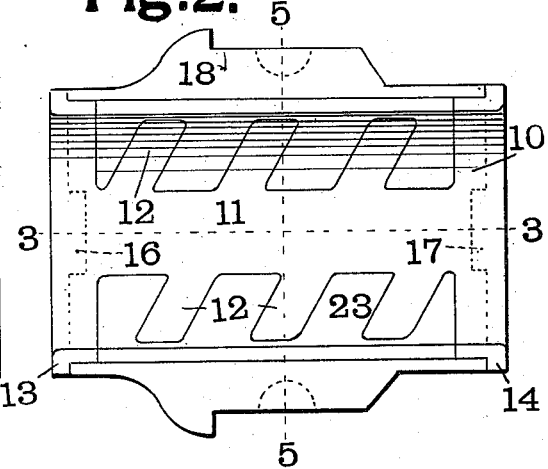
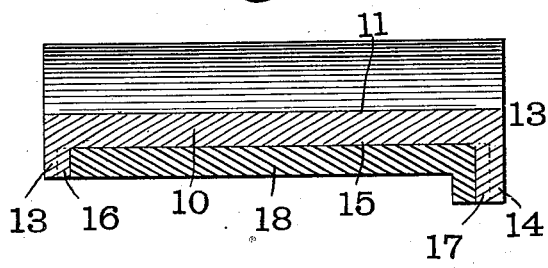
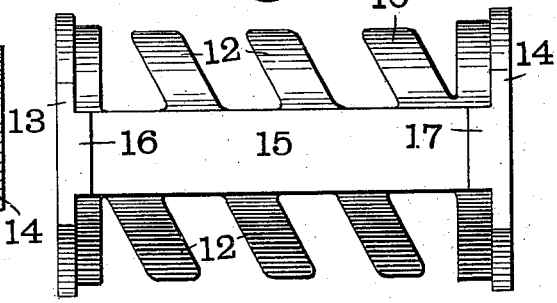
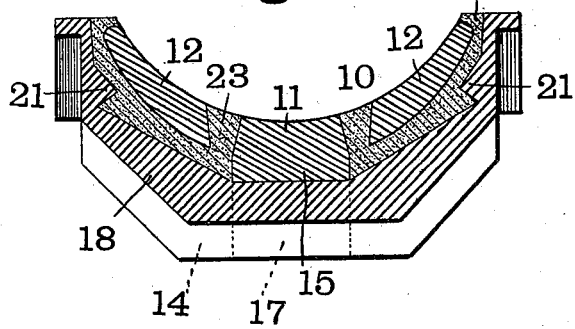
Witnesses
W. H. Alexander
J. R. Watkins
Inventor
Lewis P. Delano
By Attorneys
Fowler & Bryson

UNITED STATES PATENT OFFICE.

LEWIS P. DELANO, OF ST. LOUIS, MISSOURI.

JOURNAL-BEARING.

SPECIFICATION forming part of Letters Patent No. 687,205, dated November 26, 1901.

Application filed January 21, 1901. Serial No. 43,968. (No model.)

*To all whom it may concern:*

Be it known that I, LEWIS P. DELANO, a citizen of the United States, residing at the city of St. Louis, in the State of Missouri, have invented a certain new and useful Journal-Bearing, of which the following is such a full, clear, and exact description as will enable any one skilled in the art to which it appertains to make and use the same, reference being had to the accompanying drawings, forming part of this specification.

My invention relates more particularly to that class of journal-bearings described in my previous application, Serial No. 30,888, filed September 24, 1900, which class of bearings consists in the combination of an outer shell, an inner shell forming part of the wearing-surface, and a filling of fusible metal also forming part of the wearing-surface and holding said shells together.

The object of my invention is to provide additional means for preventing the rotation of the inner shell and fusible filling in the outer shell, a tendency to such rotation being continually exerted by the friction of the axle on the wearing-surface of the bearing when the axle is in motion.

My invention, broadly stated, consists in the combination of an outer shell or casing provided with one or more keyways, of an inner shell also forming part of the wearing-surface and provided with one or more keys fitting in said keyways, and a filling of fusible metal also forming part of the wearing-surface and holding said shells together.

In the accompanying drawings, which illustrate one form of bearing made in accordance with my invention, Figure 1 is a plan view of the outer shell or casing. Fig. 2 is a plan view of the complete bearing. Fig. 3 is a section on the line 3 3 of Fig. 2. Fig. 4 is a plan view showing the inner shell removed from the outer shell, and Fig. 5 is a slightly-enlarged section on the line 5 5 of Fig. 2.

Like marks of reference refer to similar parts in the several views of the drawings.

10 is the inner shell or casing of the bearing. The shell or casing 10 is composed of a central strip 11 and lateral strips 12. The lateral strips 12 are preferably spirally disposed, as shown in Figs. 2 and 4. The shell 10 is provided at the ends with flanges 13 and 14. Projecting downwardly from the central strip 11 is a rib 15, which rests upon the bottom of the outer casing or shell, to be hereinafter described. The under face of the shell 10 is made concave, so as to fit the axle of a car. The shell 10, so far as described, is like that shown and described in my previous application above referred to. In addition, however, it is provided with two keys 16 and 17, which keys are formed integral with the flanges 13 and 14 and are preferably of the same width as the rib 15 and preferably extend far enough to be flush with the edges of the flanges 13 and 14.

18 is the outer shell or casing, which is of the usual form. The shell or casing 18 conforms to the general shape of the top of the shell 10. The casing 18 is preferably provided at its center with a flat groove 19, which is adapted to receive the downwardly-projecting rib of the inner shell 10. On each side of the groove 19 are preferably provided one or more lugs 20 to hold the shell 10 from rotation in the shell 18 by means of their contact with the rib 15. Formed on the inner face of the shell 18, near each edge, is a rib 21. The outer shell 18, so far as above described, is the same as that described in my previous application. In addition, however, it is provided at each end with a keyway 22, which is adapted to receive one of the keys 16 or 17 on the flanges of the inner shell 10.

23 is the filling, of Babbitt or other fusible metal, which is cast between the inner and outer shells to hold the same together and which also forms a portion of the wearing-surface by extending between the strips 12, flush with the faces of said strips.

In forming my bearing the outer shell 18 and the inner shell 10 are cast separately. The inner shell 10 is made of bronze, brass, or other similar hard metal. The outer shell 18 is preferably made of cast-iron, but may be made of any other suitable hard metal. The inner shell 10 is placed in position within the outer shell 18, the rib 15 extending into the groove 19 and the keys 16 and 17 extending into the keyways 22. The two shells are then placed around a suitable mandrel or axle, and the Babbitt or other fusible metal 23 is then cast between the two shells, holding the same together. The use of the keys 16 and 17, extending into the keyways 22, positively and effectively prevents any tendency of the inner shell and the filling to turn in the outer shell. It will therefore be seen that I may dispense with the use of the lugs 20, which coöperate with the rib 15 to prevent the rotation of the inner shell. I prefer, however, to use these lugs in addition to the keys 16 and 17.

Having thus fully described my invention, what I claim as new, and desire to secure by Letters Patent of the United States, is—

1. A journal-bearing consisting of an outer shell or casing having a keyway formed in one end thereof, an inner shell forming part of the wearing-surface and provided at one end with a flange, a key formed integral with said flange and fitting in said keyway, and a filling of fusible metal holding said shells together and also forming part of the wearing-surface.

2. A journal-bearing consisting of an outer shell or casing provided at each end with a keyway, an inner shell forming part of the wearing-surface and provided at each end with a flange, a key formed integral with each of said flanges and fitting into the keyways in said outer shell, and a filling of fusible metal holding said shells together and also forming part of the wearing-surface.

3. A journal-bearing composed of an outer shell or casing having a keyway formed in one end thereof and provided with a central groove, and an inner shell consisting of a central strip adapted to fit in said groove and lateral strips projecting therefrom, there being a flange at one end of said inner shell and a key of substantially the same width as said central strip and formed integral therewith and with said flange, said key projecting into said keyway, and a filling of fusible metal holding said shells together and also forming part of the wearing-surface.

In testimony whereof I have hereunto set my hand and affixed my seal in the presence of the two subscribing witnesses.

LEWIS P. DELANO. [L. S.]

Witnesses:
A. C. FOWLER,
JAMES H. BRYSON.